(12) United States Patent
Patra et al.

(10) Patent No.: US 11,768,340 B2
(45) Date of Patent: Sep. 26, 2023

(54) SYSTEM AND METHOD FOR SCALABLE OPTICAL INTERCONNECT FOR QUANTUM COMPUTING

(71) Applicant: Lawrence Livermore National Security, LLC, Livermore, CA (US)

(72) Inventors: Susant K. Patra, Brentwood, CA (US); Jonathan L. Dubois, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 81 days.

(21) Appl. No.: 17/466,581

(22) Filed: Sep. 3, 2021

(65) Prior Publication Data

US 2023/0074774 A1 Mar. 9, 2023

(51) Int. Cl.
*G02B 6/42* (2006.01)
*G06E 1/00* (2006.01)
*G06N 10/00* (2022.01)

(52) U.S. Cl.
CPC ......... *G02B 6/4249* (2013.01); *G02B 6/4269* (2013.01); *G06E 1/00* (2013.01); *G06N 10/00* (2019.01)

(58) Field of Classification Search
CPC ...... G02B 6/42; G02B 6/4249; G02B 6/4269; G06N 10/00; G06E 1/00
See application file for complete search history.

(56) References Cited

U.S. PATENT DOCUMENTS

2021/0271999 A1* 9/2021 Paik .................. G06N 10/40
2021/0272007 A1* 9/2021 Fatemi .................. G06N 10/40

OTHER PUBLICATIONS

Rosenberg, D., Weber, S., Conway, D., Yost, D., Mallek, J., Calusine, G., Das, R., Kim, D., Schwartz, M., Woods, W. and Yoder, J.L., 3D integration and packaging for solid-state qubits. arXiv preprint arXiv: 1906.11146. Jun. 26, 2019.
Krinner, S., Storz, S., Kurpiers, P., Magnard, P., Heinsoo, J., Keller, R., Luetolf, J., Eichler, C., Wallraff A. Engineering cryogenic setups for 100-qubit scale superconducting circuit systems. EPJ Quantum Technology. Dec. 1, 2019;6 (1):2.
Duband, L., Clerc, L., Ercolani, E., Guillemet, L. and Vallcorba, R., 2008. Herschel flight models sorption coolers. Cryogenics, 48(3-4), pp. 95-105.

(Continued)

*Primary Examiner* — Tina M Wong
(74) *Attorney, Agent, or Firm* — HARNESS, DICKEY & PIERCE, PLC

(57) ABSTRACT

The present disclosure relates to an interconnect system for interfacing an electronic subsystem to a qubit package, wherein the qubit package has a plurality of independent qubits. The system makes use of an optical fiber cable having a plurality of optical fibers, which is interfaced to the electronic subsystem. A 3D optical structure is used which has a plurality of internal waveguides, and which is configured to interface the optical fiber cable to the qubit package. The 3D optical structure further has at least one subsystem for using the plurality of waveguides to receive signals of a first type from at least one of the qubits package or the optical fiber cable, to convert the signals from the first type to a second type, and to transmit the signals in the second type to the other one of the fiber optic cable or the qubit package.

20 Claims, 7 Drawing Sheets

(56) References Cited

OTHER PUBLICATIONS

Triqueneaux S., Sentis, L., Camus, P., Benoit, A., Guyot, G. Design and performance of the dilution cooler system for the Planck mission. Cryogenics. Apr. 1, 2006; 46(4): pp. 288-297.

Freund, M.M., Duband, L., Lange, A.E., Matsumoto, T., Murakami, H., Hirao, T., Sato, A.S. Design and flight performance of a space borne 3He refrigerator for the infrared telescope in space. Cryogenics. Apr. 1, 1998;38(4): pp. 435-443.

Serlemitsos, A. T., SanSebastian, M. and Kunes, E., 1998, Final Design of the Astro-E/XRS ADR. Adv. Cryo, Eng., 43, p. 957.

\* cited by examiner

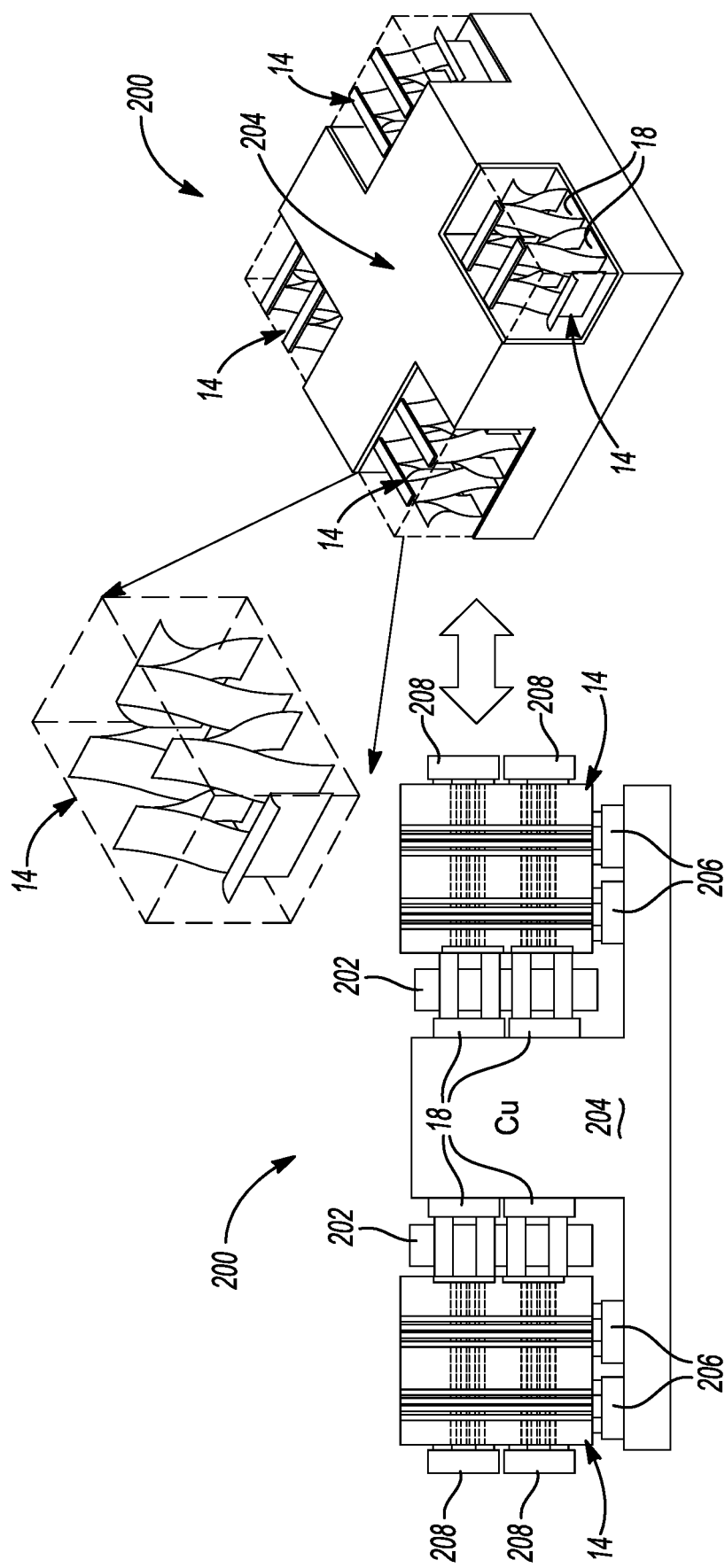

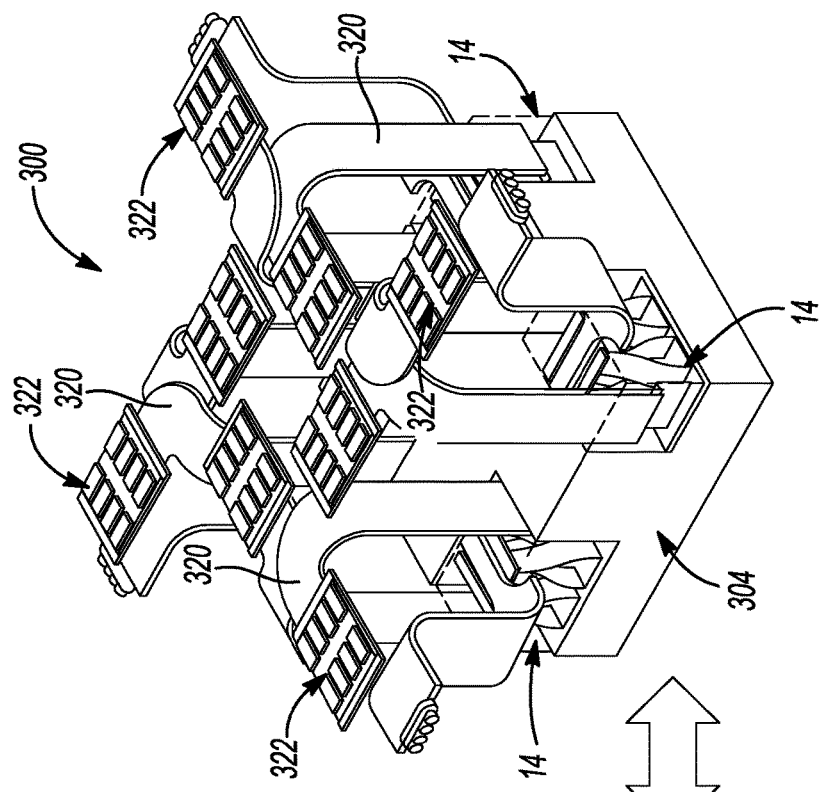
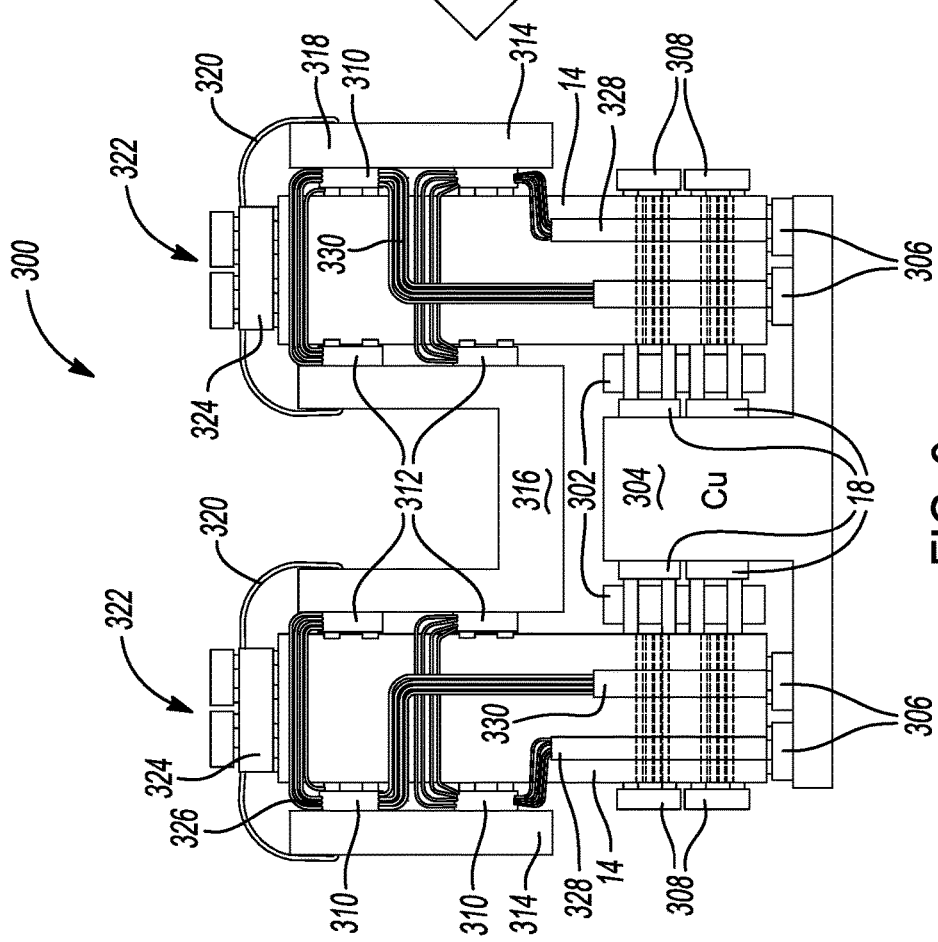
FIG. 10
FIG. 9

SYSTEM AND METHOD FOR SCALABLE OPTICAL INTERCONNECT FOR QUANTUM COMPUTING

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to interface systems used to interface a control system to a qubits plane of a quantum computing system, and more particularly to a readily scalable, all optical interface system for conducting signals to and from the qubits plane of the system.

BACKGROUND

The statements in this section merely provide background information related to the present disclosure and may not constitute prior art.

There are at least three critical issues associated with quantum computer packaging. The first issue is the thermal/signal issue. The delivery of electromagnetic control signals from the room-temperature region where they are generated to the qubits inside the refrigerator at mK temperatures requires careful thermal and electrical engineering. In the conventional architecture, wiring-whether low-frequency twisted pairs or high frequency coax must be thermalized at each temperature stage of the refrigerator to avoid excessive heating of the mixing chamber. The largest heat loads occur across the 300 to 3 K transition, and today's refrigerators can readily handle the heat loads of hundreds and even thousands of wires. For the 3 K to milli-K wires, superconducting NbTi can deliver the electrical signals faithfully, with minimal heating due to the direct thermal connection (phonons).

The second critical issue is the signal noise issue. A more important challenge is mitigating the effects of room-temperature thermal noise on the operation of the qubits. There is a trade-off between efficiently guiding a desired signal to a qubit and preventing noise from impacting its operation. A two-pronged approach is used. Filtering (attenuating signals that are not in the range of desired frequencies) is used to remove out-of-band radiation noise that is outside the frequency range of the signals intended to be delivered to the device, but attenuation must be used to reduce the in-band radiation. This means that the amplitude of the control signal is decreased at each stage in the refrigerator, since the magnitude of the thermal noise decreases with temperature. The attenuating cannot all be done at one point, since signal attenuation generates heat and thermal noise that must also decrease as the signal moves to lower temperatures. For similar reasons, the measurement of the qubit must also be done in stages, with the first stage of amplification performed at cryogenic temperatures to minimize the noise of the amplifier.

Another critical issue is the form factor issue. In this regard it will be appreciated that one critical constraint in chips with a large number of signals is packaging. The package for a supercomputing chip must house, shield, and route signals to/from a qubit chip; it is a critical part of the control plane. While the superconducting chips are relatively small-typically 5×5 $mm^2$, it is the number of wires that feed the chip and their connectors that dictate the size of the package. For the high isolation needed for quantum circuits, coaxial connectors, coaxial wiring harnesses, and miniature multi-pin connectors are examples of types of connectors being used to bring signals into the package. The higher isolation that these connectors provide make them larger than the simple pin or ball connection used in packages for conventional silicon devices, and thus the number of signals per unit area is much smaller.

Once the signals are on the package, they need to be routed to the correct location and then connected to the quantum circuit. Signals are connected to the qubit via wires using bump (connections over the area of the chip), or via wire (connections around the perimeter of the chip) bonds, or through the free-space of the package. As the number of control wires increase, these packages will need to move to area bonding methods (bump bonding) like what has been done with conventional silicon packaging. The challenge is to maintain a clean microwave environment for the qubits in the presence of these connectors and wiring. Given these constraints, one will appreciate that the packaging problem becomes very difficult as the number of signals increase to the thousands.

SUMMARY

This section provides a general summary of the disclosure, and is not a comprehensive disclosure of its full scope or all of its features.

In one aspect the present disclosure relates to an interconnect system for interfacing an electronic subsystem to a qubit package, wherein the qubit package has a plurality of independent qubits. The system may comprise an optical fiber cable having a plurality of optical fibers, and interfaced to the electronic subsystem. The system may also include a three dimensional (3D) optical structure having a plurality of internal waveguides, and configured to interface the optical fiber cable to the qubit package. The 3D optical structure further may have at least one subsystem for using the plurality of waveguides to receive signals of a first type from at least one of the qubits package or the optical fiber cable, to convert the signals from the first type to a second type, and to transmit the signals in the second type to the other one of the optical fiber cable or the qubit package.

In another aspect the present disclosure relates to an interconnect system for interfacing an electronic subsystem to a qubit package, wherein the qubit package has a plurality of independent qubits. The system may comprise an optical fiber cable having a plurality of optical fibers, and interfaced to the electronic subsystem. The system may also include an optical cube having a plurality of waveguides formed therein and interfaced to the optical fiber cable. The optical cube may include first and second subsystems. The first subsystem operates to receive input optical signals transmitted over the optical fiber cable to the optical cube, and received using a first subplurality of the plurality of waveguides, and converts the input optical signals into input electromagnetic wave signals, and then routes the input electromagnetic wave signals using a second subplurality of the plurality of waveguides to the qubits of the qubit package. The second subsystem operates to receive output electromagnetic wave signals from the qubits through a third subplurality of the plurality of waveguides, and converts the output electromagnetic wave signals into corresponding output optical signals, and then routes the corresponding output optical signals through a fourth subplurality of the plurality of waveguides out to the optical fiber cable for transmission over the optical fiber cable.

In still another aspect the present disclosure relates to a method for interfacing an electronic subsystem to a qubit package, wherein the qubit package has a plurality of independent qubits. The method may comprise using an optical fiber cable having a plurality of optical fibers to interface the electronic subsystem to a three dimensional (3D) optical structure having a plurality of internally formed waveguides. The method may further include using the 3D optical structure to interface the optical fiber cable to the qubit package, and further using a first subplurality of the plurality of internally formed waveguides to receive signals of a first type from at least one of the qubits package or the optical fiber cable. The method may further include using a subsystem associated with the 3D optical structure to convert the signals from the first type to a second type, and using the subsystem to transmit the signals of the second type, using a second subplurality of the plurality of internally formed waveguides, to the other one of the optical fiber cable or the qubit package.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 7 is a high level side view of another embodiment of the present disclosure for constructing an RF/Photonic building block for interfacing to a plurality of qubit packages;

FIG. 8 is a perspective view of the embodiment of FIG. 7 further illustrating the plurality of optical cubes used to construct the embodiment;

FIG. 9 is a high level side partial cross sectional view of another embodiment of the present disclosure which incorporates a plurality of optical cubes; and FIG. 10 is a high level perspective view of the embodiment shown in FIG. 9.

DETAILED DESCRIPTION

Example embodiments will now be described more fully with reference to the accompanying drawings.

Figure 1:
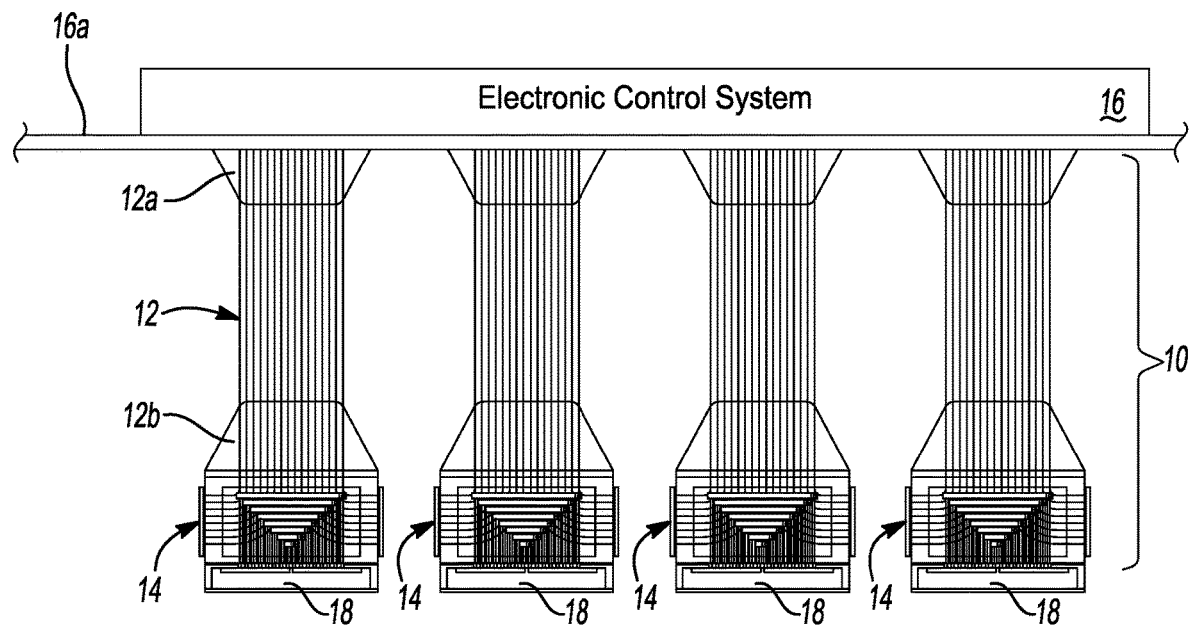
FIG. 1 is a high level, side elevation view of an all optical interface system in accordance with one embodiment of the present disclosure, and illustrating four distinct implementations of the system being used in connection with a single electronic control system.

Referring to FIG. 1, one embodiment of an all optical interface system 10 is shown in accordance with the present disclosure. In this example the system 10 includes one or more optical fiber ribbon cable assemblies 12 coupled to one of more optical waveguide structures, which in this example are formed by waveguide optical cubes 14. One side 12a of each of the optical fiber ribbon cable assemblies 12 is coupled to a circuit board 16a of an electronic control system 16, while the opposite side 12b of each optical fiber ribbon cable assembly is interfaced to a qubit package 18. In this example, each qubit package 18 has a grid of 128×128 (256 total) independent qubits, and each optical fiber ribbon cable assembly 12 has a plurality of separate optical fiber ribbon cables which collectively provide 512 separate optical fibers. One subplurality of 256 ones of the optical fibers of each optical fiber ribbon cable assembly 12 is used to form signal output paths or channels, and the remaining subplurality of 256 ones of the optical fibers are used as signal input paths or channels. Typically, the qubit package 18 comprises an area which is quite small, on the order of 5 mm×5 mm, and thus provides challenges when attempting to couple to each of the qubits of the qubit package using electrical conductors while still minimizing the thermal load imparted to the qubit package. The present system 10, through the use of the highly compact optical cubes 14 and the optical fiber ribbon cable assemblies 12, overcomes this significant limitation, as will be described further below.

As noted above, of the 512 optical fibers making up each optical fiber ribbon cable assembly 12, 256 are associated with, or act as inputs to, each one of the 256 qubits (i.e., one optical fiber to each qubit) in the qubit package 18. The remaining 256 optical fibers of each optical fiber ribbon cable assembly 12 are associated with the outputs of the qubit package 18, that is, one optical fiber for each qubit output. In this manner independent input optical signals can be sent to each qubit of the qubit package 18, through the optical fiber ribbon cable assembly 12 and the optical cube 14. In addition, independent output signals, in the form of output optical signals, can also be sent by each qubit, through the optical cube 14 and the optical fiber ribbon cable assembly 12, to the electronic control system 16.

Figure 2:
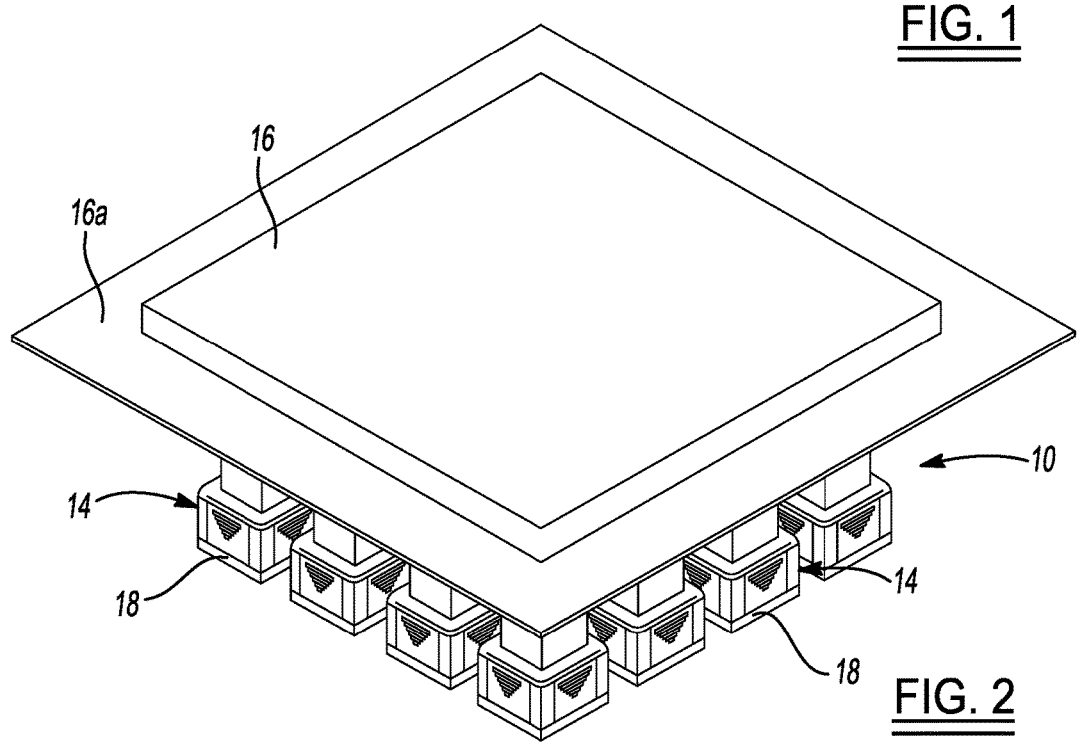
FIG. 2 is a top perspective view of the assembly shown in FIG. 1 in which sixteen of the all optical interface systems of FIG. 1 are used to interface a qubit package having 256 qubits to the electronic control system.

While four optical fiber ribbon cable assemblies 12 and four associated optical cubes 12 are shown in FIG. 1, the system 10 could make use of a smaller or greater number of optical fiber ribbon cables 12 and optical cubes 14, and the illustration of four cable/cube assemblies 12/14 is simply to make clear that the system 10 provides the significant benefit of being easily, readily scalable to accommodate interfacing to virtually any number of groups of cubit packages 18. FIG. 2 shows an embodiment making use of sixteen implementations of the system 10 accommodating 16 qubit packages 18, using sixteen independent optical fiber ribbon cable assemblies 12 and sixteen corresponding optical cubes 14.

Figure 3:
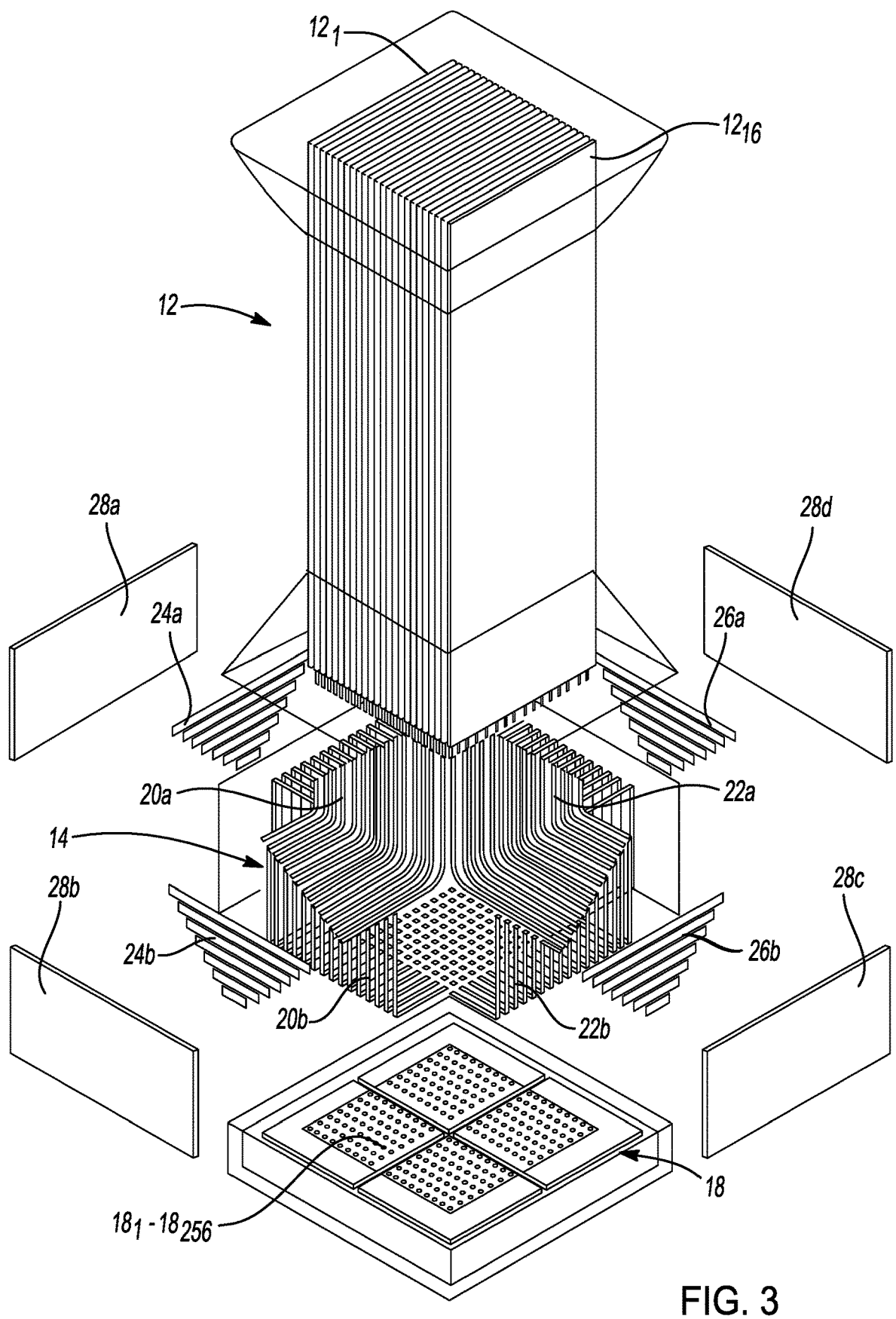
FIG. 3 is an exploded perspective view of the apparatus of FIG. 1 better illustrating the individual components associated with the optical cube.
Figure 4:
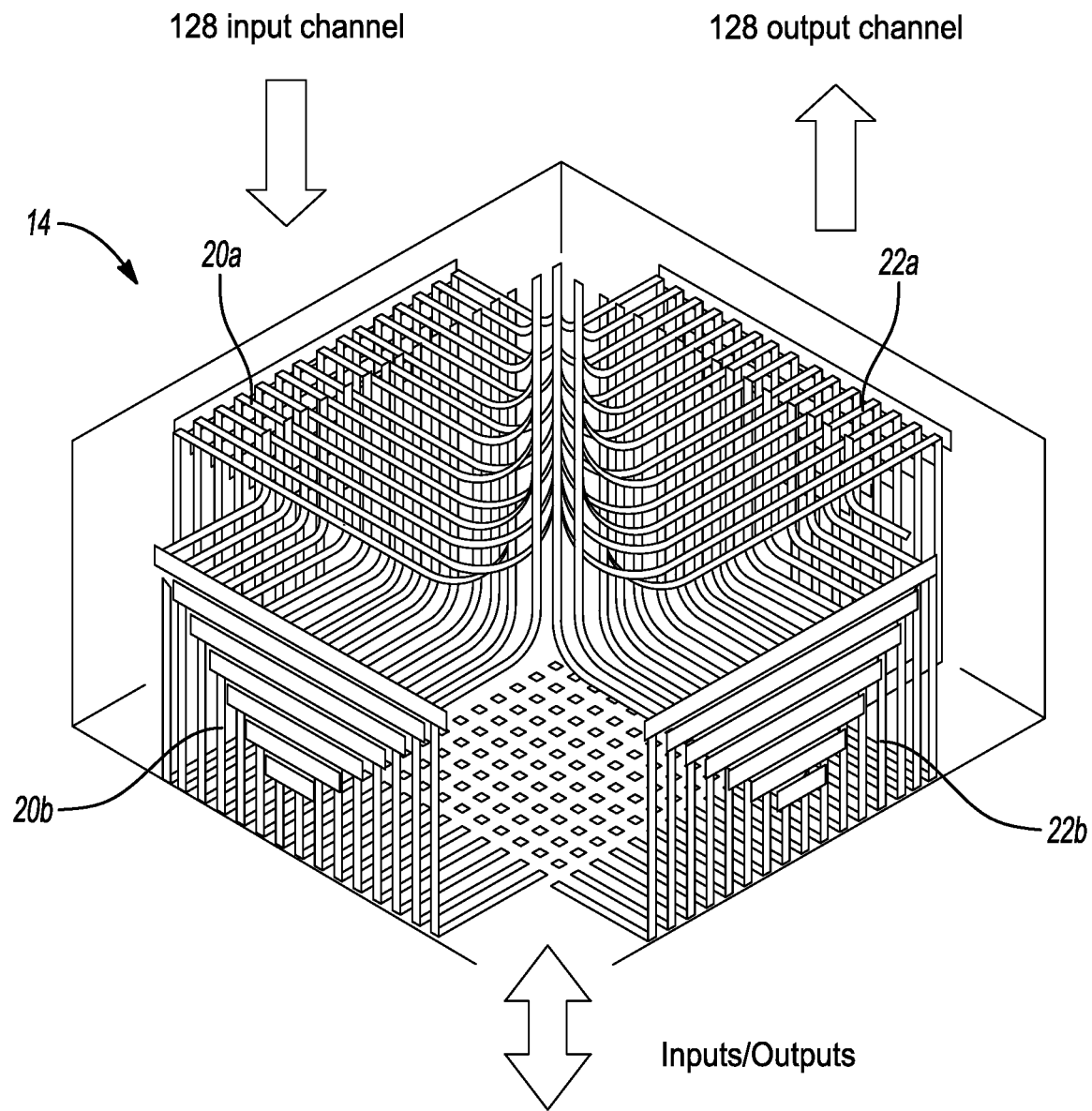
FIG. 4 is a high level perspective illustration of just the optical cube, the two photodetector arrays, the two laser diode arrays, and better illustrating the four groups of waveguides formed within the optical cube for channeling microwave energy and optical signals to and from the qubits of the qubit package.

Referring to FIGS. 3 and 4, a high level exploded perspective view (FIG. 3) of the system 10 using one optical fiber ribbon cable assembly 12 and one optical cube 14 is shown, while FIG. 4 illustrates just the optical cube 14 and its associated components. In FIG. 3 the optical fiber ribbon cable assembly 12 can be seen to be made up of a plurality of optical fiber ribbon cables $12_1$-$12_{16}$ which collectively provide the 512 independent optical fibers to communicate both input signals (via 256 ones of the optical fibers) to each qubit and output signals (via 256 ones of the optical fibers) from each qubit. And while the qubits 18a of the qubit package 18 number 256 in this example, and are arranged in a 128×128 grid, with each qubit 18a having an input and an output (not clearly visible in the figure), it will be appreciated that the present disclosure is not limited to any specific grid configuration for the qubit package 18.

With further reference to FIGS. 3 and 4, the optical cube 14 may be formed (e.g., by additive manufacturing in a layer-by-layer approach) from a suitable material such as polymer, Borofloat glass or fused silica. The optical cube 14 forms a three-dimensional (3D) structure able to form a large plurality of independent, 3D waveguides, in an extremely compact and space efficient package. And while the optical cube 14 is shown having a square cubic shape, it will be appreciated that the optical cube just as readily be formed having other 3D shapes other than a square cubic shape. The optical cube 14 routes electromagnetic wave signals (e.g., both microwave signals and optical signals) to and from the qubit package 18.

The optical cube 14 in this example is constructed to include four distinct groups of 3D internal waveguides 20a, 20b, 22a and 22b. The optical cube 14 further includes a photodetector subsystem formed by two photodetector arrays 24a and 24b, and an optical subsystem formed by two laser-based optical subsystems, which in this example comprise laser diode arrays 26a and 26b. The optical cube 14 further includes at least one heat sink, and preferably a plurality of heat sinks in the form of cascaded NIS (Normal-Insulator-Superconductor) tunnel junction refrigerator subsystems 28a, 28b, 28c and 28d, which operate in the sub-Kelvin regime. The groups of waveguides 20a and 20b each form 256 waveguide channels (i.e., 512 total). A first subplurality (128) of the waveguides of the waveguide group 20a receive input optical signals associated with 128 ones of the qubits 18a, which are received through the optical fiber ribbon cable assembly 12 from the electronic control system 16. A second subplurality (128 ones) of the waveguides of the waveguide group 20a provide separate waveguide transmission paths within the optical cube 14 to the second group of photodetector arrays 24b. Internal waveguide group 20b provides a first subplurality of waveguides channels which couple an output from each one of the 128 photodetectors of photodetector array 24a to 128 inputs of the qubits 18. A second subplurality of the waveguides of waveguide group 20b couple the outputs from the 128 photodetectors of photodetector array 24b to the inputs of the remaining 128 ones of the qubits 18.

With further reference to FIGS. 3 and 4, the waveguide group 20c forms 256 independent waveguides of which a first subplurality of 128 ones of the waveguides communicate with outputs of 128 corresponding ones of the qubits 18a, and the remaining 128 waveguides of the waveguide group 20c communicate with corresponding ones of the remaining 128 qubits. Thus, waveguide group 20c is able to receive and independently channel output signals from each of the 256 qubits 18a. The first subplurality of the waveguides of the waveguide group 20c couple the outputs from their respective qubits 18a to inputs of respective separate ones of the laser diodes of laser diode array 26a, while the second subplurality of waveguides of the waveguide group 20c couple outputs from respective ones of the remaining 128 qubits to the inputs of the laser diodes of the second laser diode array 26b. Thus, each one of the laser diodes of the laser diode arrays 26a and 26b is independently associated with one specific qubit 18a, and receives output signals only from its one associated qubit.

With further reference to FIGS. 3 and 4, the waveguide group 20d provides 256 independent waveguide channels, with a first subplurality of 128 ones of the waveguide channels of the waveguide group 20d being used to channel the outputs from the laser diodes of the first laser diode array 26a out from the optical cube 14 and into 128 corresponding ones of the optical fibers of the optical fiber cable 12. A second subplurality of 128 ones of the waveguide channels of the waveguide group 20d receive the outputs from the remaining 128 laser diodes of the second laser diode array 26b, and channel the optical signals out to a separate group of 128 ones of the optical fibers of the optical fiber cable 12. Thus, each laser diode of the laser diode arrays 26a and 26b transmits an optical signal corresponding to the output of its associated qubit, out over a separate waveguide channel from within the optical cube 14, and onto separate optical fibers of the optical fiber ribbon cable assembly 12.

It will be appreciated that while the optical cube 14 includes components which enable the conversion of optical signals into electromagnetic microwave signals (i.e., the photodetector arrays 24a and 24b), and from microwave signals into optical signals (i.e., the laser diode arrays 26a and 26b), the optical cube 14 could just as readily be used with one or the other of these two conversion subsystems. However, it is expected that in most implementations, but of these conversion capabilities will be needed or desired.

Figure 5:
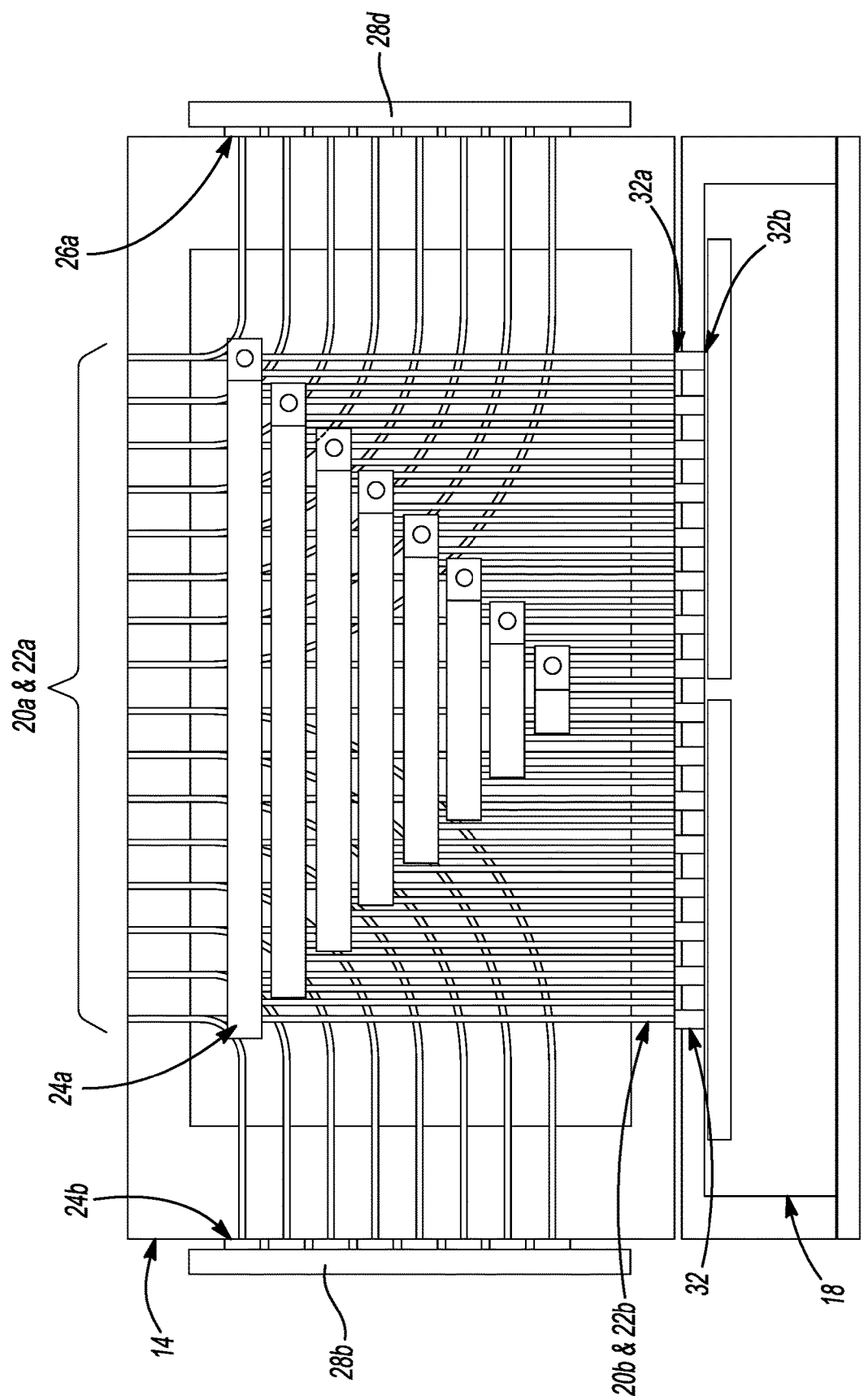
FIG. 5 is a high level simplified side view of the optical cube with three of the four cascaded NIS refrigerators shown positioned against two of the photodetector arrays and one of the laser diode arrays, and further illustrating various ones of the waveguides of the four waveguide groups which couple the inputs and outputs of the qubits to photodetectors and the laser diodes, and the which also couple the inputs and outputs of the photodetector arrays and the laser diode arrays to the optical fiber cable; illustrating the separate groups of waveguides used for inputting signals to the two photodetector arrays, for channeling outputs from the photodetector.

With brief reference to FIGS. 4 and 5, the cascaded NIS refrigerator subsystems 28a and 28b may be positioned adjacent to and in thermal contact with the photodetector arrays 24a and 24b, respectively, to act as local heat sinks to provide continuous cooling of the photodetector arrays 24a and 24b. Similarly, the cascaded NIS refrigerator subsystems 28c and 28d may be placed adjacent to and in thermal contact with the laser diode arrays 26a and 26b to act as heat sinks to provide continuous cooling of the laser diode arrays (FIG. 5 illustrating only the combination of laser diode array 26a and cascaded NIS refrigerator 28d).

Referring further to FIG. 3, if one wishes to provide power to the qubits 18a of the qubit package 18, then one or more photovoltaic cells 30 may be positioned in place of one or more of the laser diodes of one of the laser diode arrays 26a or 26b. Of course, it will be appreciated that this eliminates one or more of the laser diodes from the laser diode array 26a or 26b, and would reduce the number of qubits 18a that can be communicated with by at least 1. Such a feature would also necessitate separate circuit lines constructed within the optical cube 14 to communicate electrical power from the one or more photovoltaic cells 30 to each of the qubits 18a.

FIG. 5 also illustrates a plurality of tubular joint interface elements 32 that are used to couple microwave energy into or out from the inputs and outputs, respectively of the qubits 18a. The tubular joint interface elements 32 are preferably made from a low thermal conductivity material such as Indium with a $VO_2$ interface at both ends of the interface joint, and have a height of typically between 0.25 mm-0.5 mm, and a diameter of typically between 0.1 mm-0.2 mm. The tubular joint interface elements 32 thus operate as waveguide transitions between the qubits 18a and the groups of waveguide channels 20a-20d of the optical cube 14, as well as directional thermal paths to help channel heat out from the qubit package 18. Therefore, each qubit 18a will be associated with two separate ones of the tubular joint interface elements 32, one to receive the qubit's electromagnetic wave (e.g., microwave) output and the other to provide an electromagnetic wave (e.g., microwave) input to the qubit. A total of 512 joint interface elements 32 will therefore be present to interface the 256 qubits 18a of the qubit package 18 to the optical cube 14.

From FIG. 5 it will also be appreciated that each tubular joint interface element 32 includes phase-transition material sections 32a and 32b on its opposing sides to assist in channeling the microwave energy into and out from the qubits 18a. The phase transition material sections 32a and 32b may be formed from, for example, Vanadium-dioxide ($VO_2$). The phase transition material sections 32a and 32b effectively act like one-way thermal diodes to channel heat out from their respective qubits 18a.

FIG. 4 also better illustrates a subplurality of the waveguide channels of the waveguide group 20a which feed optical signals to the inputs of the two photodetector arrays 24a and 24b, as well as a subplurality of the waveguide channels of the waveguide group 20b that feed microwave energy output signals from the photodetector arrays 24a and 24b to the inputs of the qubits 18a. Also shown is a subplurality of waveguide channels of the group of waveguide group 22a which channel optical signals from the laser diode array 28d to the optical fiber cable 12, as well as a subplurality of the waveguide channels 22b that transmit microwave energy output signals from the qubits 18a to inputs of the laser diodes of the laser diode array 26a.

Figure 6:
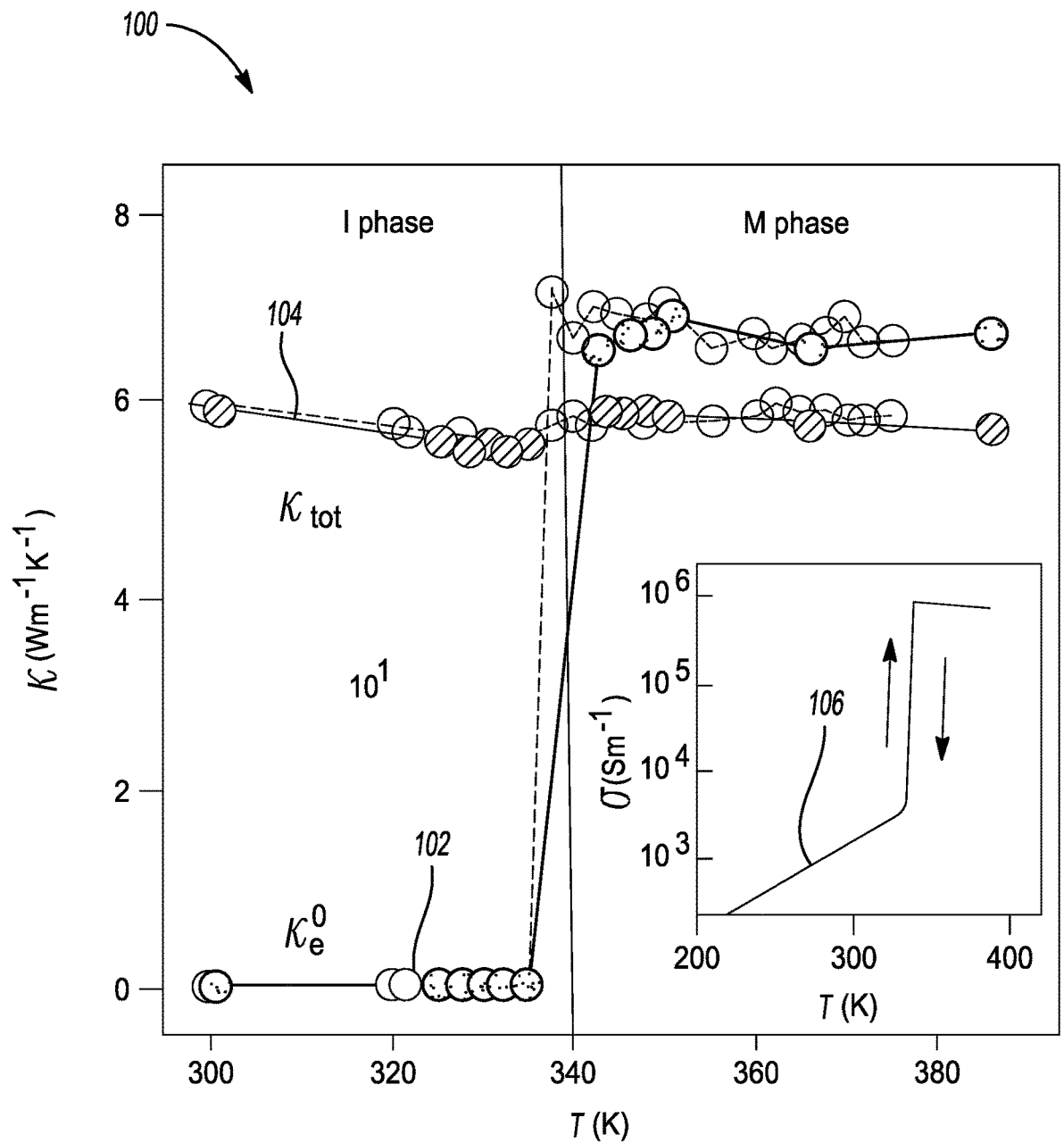
FIG. 6 is a graph showing curves illustrating both thermal conductivity and electrical conductivity at the $VO_2$ interface between the optical cube and the qubit package.

Referring now to FIG. 6, it will be appreciated that one important aspect of cryogenic packaging is to minimize thermal leakage from the operational environment to the device housed in a cryogenic environment. One of the leakage paths is electrical routing that is needed to power the cryogenic device. In the packaging scheme, one wants a material that is electrically conductive while thermally insulating at the qubit joining interface. This is accomplished by the $VO_2$ material of phase transition sections 32a and 32b, which is one highly suitable material that works much like a "thermal" diode. In most normal metals the charge and heat conductivities are related via the Wiedemann-Franz (WF) law: The ratio between the electronic thermal conductivity (ke) and the product of electrical conductivity (s) and absolute temperature (T) is a constant called the Lorenz number, $L=ke/sT$. However, the effect in the metallic phase of $VO_2$ in the vicinity of its metal-insulator transition (MIT). $VO_2$ undergoes the MIT at 340° K. An order-of-magnitude breakdown of the Wiedemann-Franz law at high temperatures ranging from 240° to 340° kelvin in metallic Vanadium dioxide in the vicinity of its metal-insulator transition. In fact, one can argue that during this transition period, it acts as a thermal diode that switches between acting as a thermally conductive material to acting as a thermally insulating material with minimal effect to the electrical conductivity.

The graph 100 shown in FIG. 6 helps to illustrate the above action of the $VO_2$ acting as a thermal diode. Curve 102 illustrates how the thermal conduction of $VO_2$ is essentially zero, up to almost 340° K, at which point thermal conduction dramatically increases, and at about 345° K maximum thermal conduction is occurring. Curve 104 shows total thermal conductivity. Curve 106 shows electrical conductivity through the $VO_2$, wherein at about 340° K the electrical conductivity suddenly and dramatically changes (i.e., either increases or decreases suddenly) depending on whether the temperature in K is increasing or decreasing.

Referring now to FIGS. 7 and 8, a system 200 is shown in accordance with another embodiment of the present disclosure. The system 200 illustrates how a plurality of 3D optical cubes 14 can be interfaced to a plurality of qubit packages 18, in this example via a plurality of through-guide-via ("TGV") subsystems 202. In this example the qubit packages 18 are mounted on a portion of a substrate 204 (e.g., a copper substrate). Photo detector arrays 206 may also be mounted on the substrate 204 and interfaced to the optical cubes 14. Single photon detector ("SPD") arrays 208 are also shown being interfaced to the optical cubes 14 via flip chip bond pads (i.e., small solid material sections of for example Au, In or InPb).

The optical based system 10 thus provides a number of important benefits over conventional systems which have used metal conductors for communicating both signal and power to a qubit package. The glass fibers of the optical fiber cable 14 have very low thermal conductivity, and thus act as a substantial barrier to heat to thus prevent heat from being conducted into the qubit package 18. The localized cooling provided by each cascaded NIS refrigerator subsystem 28a-28d also operates as a thermal "interception" means to further reduce heat from being channeled into the qubit package 18.

FIGS. 9 and 10 shown a system 300 in accordance with another embodiment of the present disclosure. This embodiment is similar to the system 200 and includes TVG subsystems 302 for interfacing the qubit packages 18 to the optical cubes 14, which in this example are elongated to form rectangular shaped cubic-like structures. A substrate 304 supports the qubit packages 18, as well as photodetector arrays 306. SPD arrays 308 are also interfaced to each of the optical cubes 14. The optical cubes are further interfaced to photonic IC ("PIC") subsystems 310 (e.g., InP or SI PIC arrays) and InP Power DAC driver 312 subsystems 312, against which are disposed thermoelectric cooling modules 314, 316 and 318. RF-Flex cables assemblies 320 couple the TEC modules 314, 316 and 318 to TEC control subsystems 322, which are in turn interfaced to RF LTCC circuits 324. Optical wirebonds 326 couple the internal input and output waveguides 328 and 330 formed within the optical cubes 14.

The various embodiments discussed herein thus provide a highly compact, scalable means for interfacing an electronic subsystem to a qubit package via an all optical interface system. The optical cube 14 and fiber optic ribbon cable assembly 12 also provide a means for significantly minimizing thermal noise, as well as providing effective localized thermal management of the active subsystems (photodetector subassemblies 24 and laser diode subassemblies 26) via the cascaded NIS refrigerator subsystems 28a-28d. The compact packaging provided by the system described herein eliminates or reduces many of the drawbacks typically encountered when using conventional coupling architecture (i.e., twisted pair wiring or high-frequency coaxial cabling), and particularly the transmission of heat from such conventional electrical conductors that otherwise adds to the challenge of maintaining the qubit package at or near its optimal temperature.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An interconnect system for interfacing an electronic subsystem to a qubit package, wherein the qubit package has a plurality of independent qubits, the system comprising:
    an optical fiber cable having a plurality of optical fibers, and interfaced to the electronic subsystem;
    a three dimensional (3D) optical structure having a plurality of internal waveguides forming a first plurality of channels for inputs and a second plurality of channels for outputs, and configured to interface the optical fiber cable to the qubit package; and
    the 3D optical structure further having at least one subsystem for using the plurality of waveguides to receive signals of a first type from at least one of the qubits package or the optical fiber cable, to convert the signals from the first type to a second type, and to transmit the signals in the second type to the other one of the optical fiber cable or the qubit package; and
    wherein the plurality of waveguides of the 3D optical structure are configured to transmit at least a first subplurality of the signals as input signals to the qubit package via the first plurality of channels of the optical fiber cable, and to transmit at least a second subplurality of the signals via the second plurality of channels of the optical fiber cable as output signals received from the qubit package.

2. The system of claim 1, wherein:
    the at least one subsystem comprises a photodetector subsystem;
    the first type of signals comprise optical signals received from the optical fiber cable; and
    the second type of signals comprise electromagnetic wave signals transmitted to the qubit package.

3. The system of claim 1, wherein:
    the at least one subsystem comprises a laser based optical subsystem;
    the first type of signals comprise electromagnetic wave signals received by the laser based optical subsystem from the qubit package; and
    the second type of signals comprise optical signals transmitted from the laser based optical subsystem to the optical fiber cable.

4. The system of claim 1, wherein the at least one subsystem is disposed on a wall of the optical structure.

5. The system of claim 1, further comprising a refrigerator subsystem disposed adjacent the at least one subsystem for acting as a heat sink to draw heat out from the at least one subsystem.

6. An interconnect system for interfacing an electronic subsystem to a qubit package, wherein the qubit package has a plurality of independent qubits, the system comprising:

an optical fiber cable having a plurality of optical fibers, and interfaced to the electronic subsystem;

an optical cube having a plurality of waveguides formed therein and interfaced to the optical fiber cable, the optical cube including:

a first subsystem for receiving input optical signals transmitted over the optical fiber cable to the optical cube, and received using a first subplurality of the plurality of waveguides, and converting the input optical signals into input electromagnetic wave signals, and routing the input electromagnetic wave signals using a second subplurality of the plurality of waveguides to the qubits of the qubit package; and a second subsystem for receiving output electromagnetic wave signals from the qubits through a third subplurality of the plurality of waveguides and converting the output electromagnetic wave signals into corresponding output optical signals, and routing the corresponding output optical signals through a fourth subplurality of the plurality of waveguides out to the optical fiber cable for transmission over the optical fiber cable.

7. The system of claim 6, wherein the first subsystem comprises at least one photodetector array.

8. The system of claim 6, wherein the second subsystem comprises at least one optical subsystem.

9. The system of claim 8, wherein the at least one optical subsystem comprises at least one laser diode array.

10. The system of claim 7, wherein the at least one photodetector array is disposed adjacent one wall of the optical cube.

11. The system of claim 6, wherein the first subsystem comprises:

a first photodetector array disposed adjacent a first wall of the optical cube; and a second photodetector array disposed adjacent a second wall of the optical cube.

12. The system of claim 6, wherein the second subsystem comprises:

a first laser diode subsystem disposed adjacent a first wall of the optical cube; and a second laser diode subsystem disposed adjacent a second wall of the optical cube.

13. The system of claim 6, further comprising a refrigerator subsystem disposed adjacent to the first subsystem configured to act as a heat sink to draw heat out from the first subsystem.

14. The system of claim 6, further comprising a refrigerator subsystem configured to act as a heat sink to draw heat out from the second subsystem.

15. The system of claim 6, further comprising:

a first cascaded Normal-Insulator-Superconductor (NIS) tunnel junction refrigerator subsystem disposed adjacent the first subsystem and configured to channel heat out from the first subsystem; and a second, cascaded NIS tunnel junction refrigerator subsystem disposed adjacent the second subsystem and configured to channel heat out from the second subsystem.

16. The system of claim 6, further comprising a plurality of junction elements for interfacing electromagnetic wave signals between the optical cube and qubits of the qubit package.

17. The system of claim 16, further comprising a plurality of Vanadium dioxide ($VO_2$) material sections for assisting in interfacing the plurality of junction elements to the optical cube and the qubit package and channeling heat out from the qubit package.

18. The system of claim 6, further comprising at least one photovoltaic cell disposed adjacent a wall of the optical cube for providing power to at least one of the qubits of the qubit package using at least one of the plurality of waveguides of the optical cube.

19. The system of claim 6, wherein the optical fiber cable comprises an optical fiber ribbon cable assembly having a plurality of optical fiber ribbon cables.

20. A method for interfacing an electronic subsystem to a qubit package, wherein the qubit package has a plurality of independent qubits, the method comprising:

using an optical fiber cable having a plurality of optical fibers to interface the electronic subsystem to a three dimensional (3D) optical structure having a plurality of internally formed waveguides;

using the 3D optical structure to interface the optical fiber cable to the qubit package;

further using a first subplurality of the plurality of internally formed waveguides forming independent input transmission channels to operate as one of inputs or outputs to receive signals of a first type from at least one of the qubits package or the optical fiber cable;

using a subsystem associated with the 3D optical structure to convert the signals from the first type to a second type; and using the subsystem to transmit the signals of the second type, using a second subplurality of the plurality of internally formed waveguides, to the other one of the optical fiber cable or the qubit package, wherein the second subplurality of the internally formed waveguides operate as the other of the inputs or outputs.

* * * * *